United States Patent [19]

Kikuchi

[11] 4,403,285

[45] Sep. 6, 1983

[54] SYSTEM FOR AUTOMATICALLY RELEASING A DEAD LOCK STATE IN A DATA PROCESSING SYSTEM

[75] Inventor: Ryoichi Kikuchi, Yokohama, Japan

[73] Assignee: Fujitsu Limited, Kawasaki, Japan

[21] Appl. No.: 214,201

[22] Filed: Dec. 8, 1980

Related U.S. Application Data

[63] Continuation-in-part of Ser. No. 937,601, Aug. 28, 1978, abandoned.

[30] Foreign Application Priority Data

Sep. 13, 1977 [JP] Japan .................. 52-110238

[51] Int. Cl.³ .......................................... G06F 13/00
[52] U.S. Cl. .................................................. 364/200
[58] Field of Search .................. 364/200, 900, 300

[56] References Cited

U.S. PATENT DOCUMENTS

| 3,639,912 | 2/1972 | Campbell | 364/200 |
| 3,889,237 | 6/1975 | Alferness | 364/200 |
| 4,047,161 | 9/1977 | Davis | 364/200 |
| 4,084,228 | 4/1978 | Dufond et al. | 364/200 |

OTHER PUBLICATIONS

Madnick/Donovan, "Operating Systems".

*Primary Examiner*—James D. Thomas
*Assistant Examiner*—David Y. Eng
*Attorney, Agent, or Firm*—Staas & Halsey

[57] ABSTRACT

A dead lock releasing method automatically releases a dead lock state in a data processing system, wherein a plurality of kinds of tasks selectively use a plurality of common resources. When one task X occupies a resource A and, in this state, the task is to occupy a resource B, if the resource B is occupied by another task Y, the task X is placed in a waiting state. When the task X is placed in a waiting state based on the occupation of the resource B by the task Y and the task Y, which is to occupy the resource A, is placed in a waiting state based on the occupation of the resource A by the task X, the task X and the task Y are placed in a dead lock state. When the dead lock state is caused between the tasks X and Y, the occupation of the resource A by the task X is released and the processing of the task Y is carried out. Then the processing of the task X is carried out.

13 Claims, 17 Drawing Figures

Fig. 2
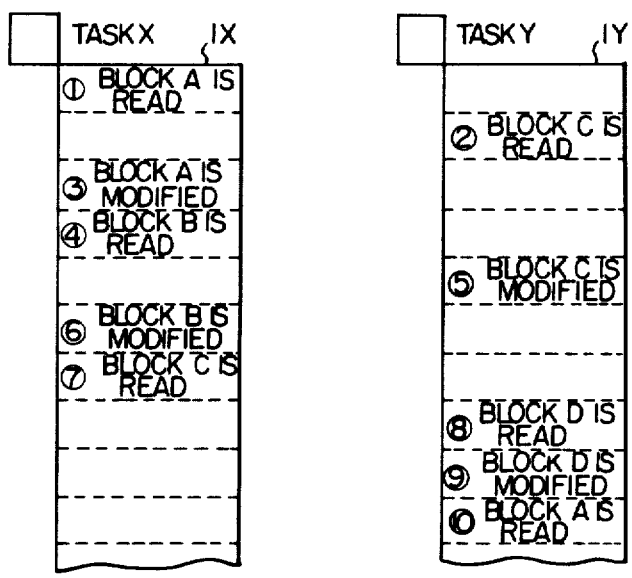
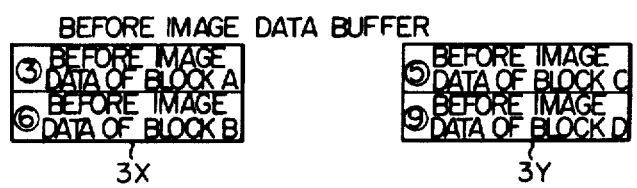

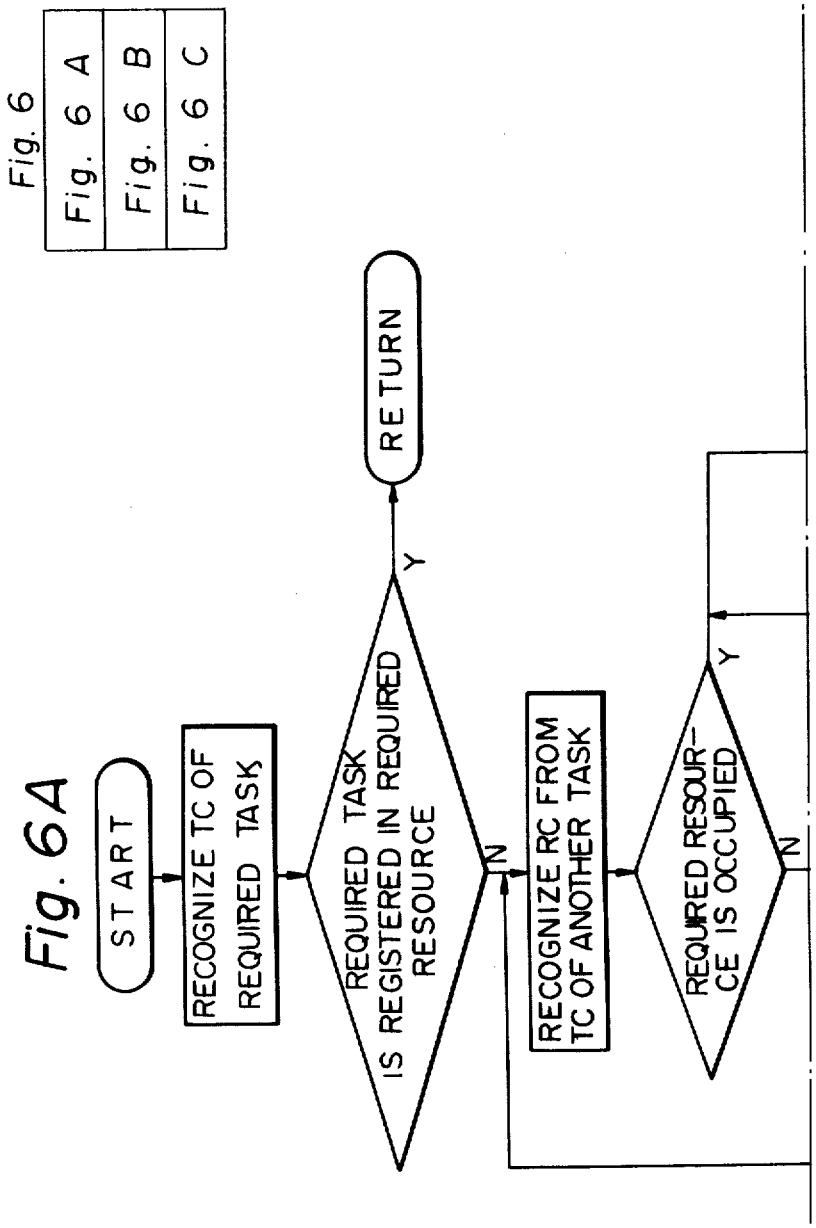

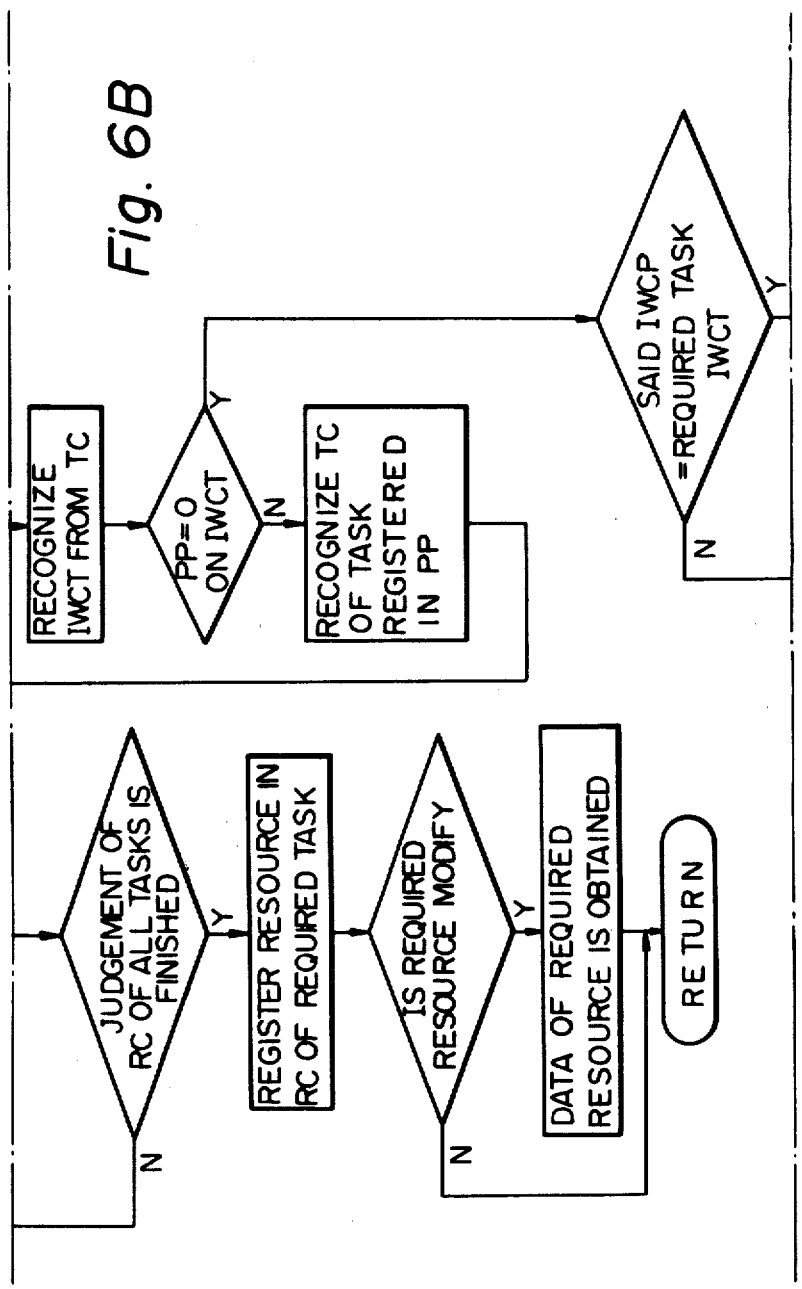

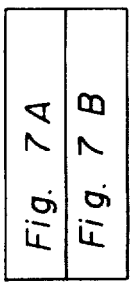
| Fig. 7 | |
|---|---|
| Fig. 7A | |
| Fig. 7B | |
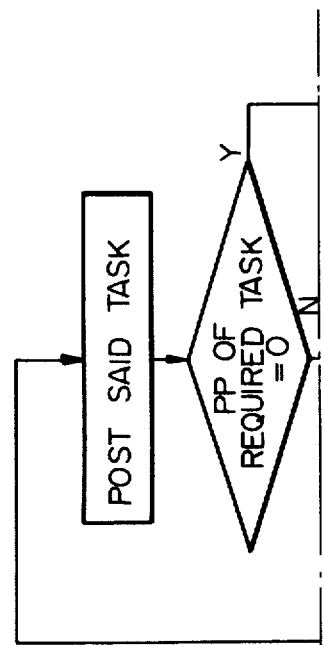
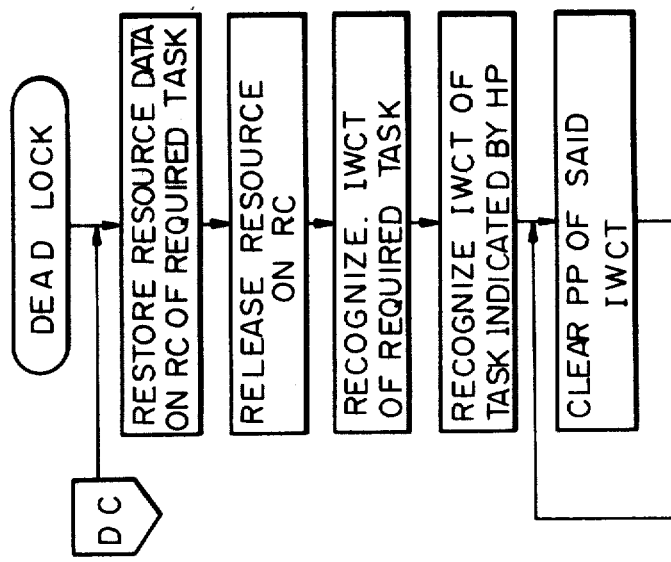

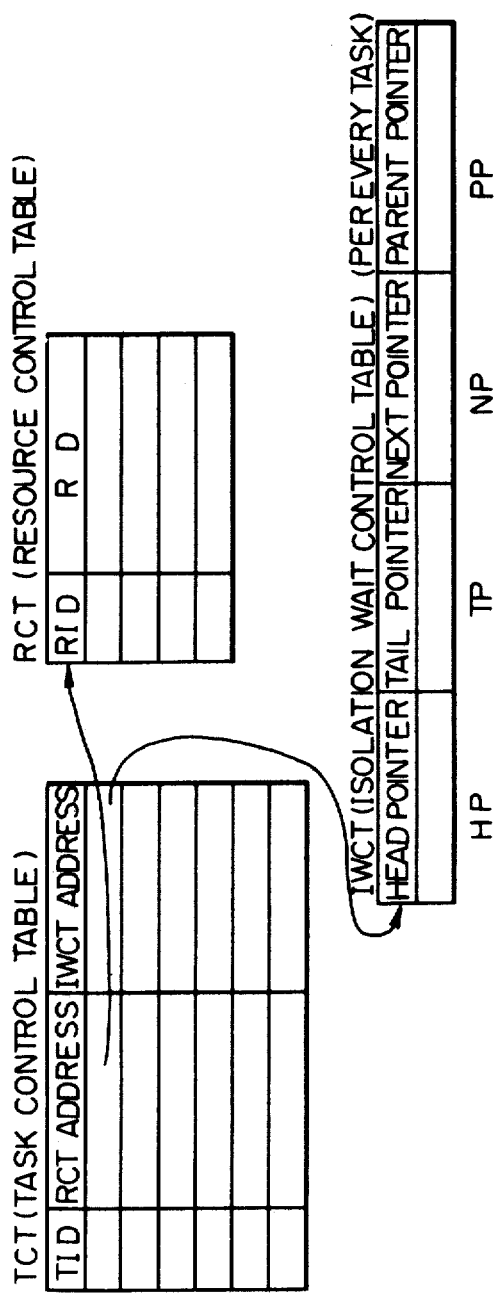

DECISION ABOUT ANOTHER TASK WHICH OCCUPIES THE RESOURCE

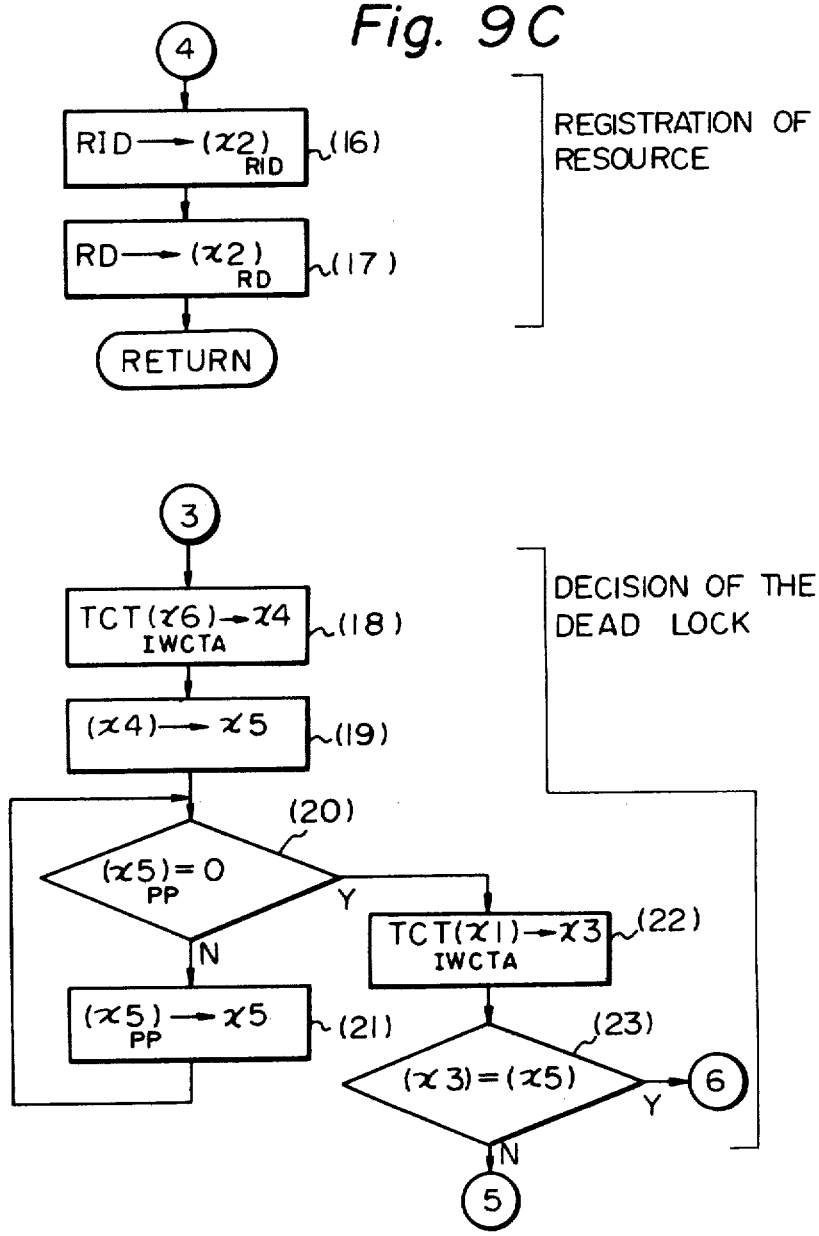

SYSTEM FOR AUTOMATICALLY RELEASING A DEAD LOCK STATE IN A DATA PROCESSING SYSTEM

CROSS REFERENCE TO RELATED APPLICATION

This application is a continuation-in-part application of U.S. application Ser. No. 937,601 filed Aug. 28, 1978 now abandoned.

BACKGROUND OF THE INVENTION

The present invention relates to a method for automatically releasing a dead lock state in a data processing system wherein a plurality of kinds of tasks commonly utilize a plurality of resources.

In the data processing system, especially in an on-line data processing system, a plurality of kinds of tasks commonly use a plurality of resources (hereinafter, sometimes called "blocks") in carrying out the data processing operation. In the conventional system, when one task is to use one resource, an occupation designation is specified for the resource by a conventional macro instruction such as "LOCK" or "ENQ" and the utilization of the resource by another task is inhibited. However, in such a case a so-called dead lock state may be caused for the following reason. That is, when one task X occupies or uses a resource A and, in this state, the task X is to occupy a resource B, if the resource B is occupied by another task Y, the task X is placed in a waiting state. On the other hand, when the task Y occupies the resource B and, in this state, the task Y is to occupy the resource A, the task Y is also placed in a waiting state. This phenomenon is called a "dead lock state".

Obviously the programming of the data processing system should be planned carefully and the debugging should be carried out so as to avoid the dead lock phenomenon. However, when the number of tasks which are to be processed in parallel increases, the dead lock phenomenon cannot be avoided, even if the programming of the data processing system is carefully planned and the debugging is thoroughly carried out.

SUMMARY OF THE INVENTION

An object of the present invention is to provide a system which can automatically eliminate a dead lock state in a data processing system.

Another object of the present invention it to provide a system for programming the data processing apparatus without causing problems which typically occur when programming is planned.

The above-mentioned objects can be achieved by a system for automatically releasing a dead lock state in a data processing system, wherein a plurality of kinds of tasks commonly use a plurality of resources. The system comprises a storage unit having a waiting task control table storing portion which stores the information concerning any task which is in a waiting state due to the occupation of a desired resource by a certain other task, and a storing before image data buffer portion which stores before image data every time the content of the desired resource is modified. Then when the waiting state is generated with respect to a first task, the system examines the waiting state of the other tasks in accordance with the content of the waiting task control table storing portion and determines whether or not the waiting state of the other tasks is due to the occupation of the resource by the first task. When the waiting state of the other tasks is due to the occupation of the resource by the first task, the system releases the occupation of the resource by the first task, the system carries out the processing of the other tasks in accordance with the content of the before image data buffer portion, and then the system carries out the processing of the first task.

Further features and advantages of the present invention will be apparent from the ensuing description with reference to the accompanying drawings, to which, however, the scope of the invention is in no way limited.

BRIEF DESCRIPTION OF THE DRAWINGS

FIG. 2 is a block diagram utilized to describe a system which can release the dead lock state between two tasks;

FIG. 8 is a diagram which shows the content of the task controllers and the resource controllers shown in FIG. 5; and FIGS. 9A through 9F are flow charts of FIG. 5 and FIG. 8.

DESCRIPTION OF THE PREFERRED EMBODIMENTS

Figure 1:
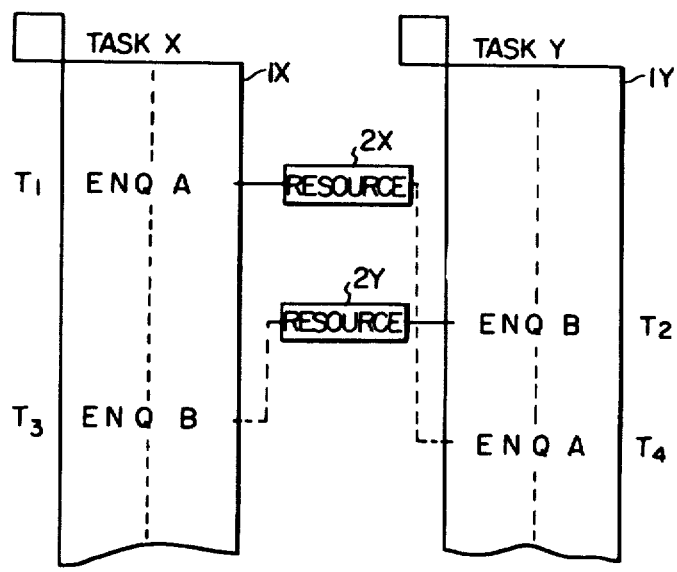
FIG. 1 is a block diagram utilized to describe a dead lock state between two tasks.

Referring to FIG. 1, 1X designates a program for carrying out a task X, 1Y designates a program for carrying out a task Y, and 2X and 2Y designate resources. For the purpose of explanation, it is assumed that the task X occupies the resource 2X at a time $T_1$ by an exclusive macro command, "ENQ A" (for example) and, in this state, at a time $T_3$, the task X is to occupy the resource 2Y by the macro command "ENQ B". On the other hand, it is assumed that the task Y occupies the resource 2Y at a time $T_2$ by the macro command "ENQ B" and, in this state, at a time $T_4$, the task Y is to occupy the resource 2X by the macro command "ENQ A". Under these circumstances, at the time the task X generates the command "ENQ B", the task X is place in a waiting state by the task Y and, at the time the task Y generates the command "ENQ A", the task Y is placed in a waiting state by the task X. That is the tasks X and Y are placed in the dead lock state.

FIG. 2 is a diagram utilized to describe a system which can release a dead lock state between two tasks X and Y. Referring to FIG. 2, 1X and 1Y designate programs for carrying out the tasks X and Y, respectively, 3X and 3Y designate before image data buffers, respectively, and 4 designates the waiting task control table. In the programs 1X and 1Y shown in FIG. 2, at time ①, the task X occupies and reads a block A; at time ②, the task Y occupies and reads a block C; at time ③, task X modifies the content of the block A; at time ④, the task X occupies and reads a block B; at time ⑤, the task Y modifies the content of the block C; at time ⑥, the task X modifies the content of the block B; at time ⑦, the task X is to occupy the block C, however, it is placed in a waiting state; at time ⑧, the task Y occupies and reads the block D; at time ⑨, the task Y modifies the content of the block D; and, at time ⑩, the task Y is to occupy the block A, however, it is placed in a waiting state.

In the above-mentioned processing, at the time ①, the information "Block A is occupied by task X" is written in the waiting task control table 4; at the time ②, the information "Block C is occupied by task Y" is written in the waiting task control table 4; at the time ③, the before image data of the block A is stored in the before image data buffer 3X; at the time ④, the information "Block B is occupied by task X" is written in the waiting task control table 4; at the time ⑤, the before image data of the block C is stored in the before image data buffer 3Y; at the time ⑥, the before image data of the block B is stored in the before image data buffer 3X; at the time ⑦, the information "the occupation of the block C by the task X is being kept waiting by the task Y" is written in the waiting task control table 4; at the time ⑧, the information "Block D is occupied by task Y" is written in the waiting task control table 4; at the time ⑨, the before image data of the block D is stored in the before image data buffer 3Y; and, at the time ⑩, the information "the occupation of the block A by the task Y is being kept waiting by the task X" is written in the waiting task control table 4. At this juncture, whether or not the waiting state of the tasks is a dead lock state is examined. In the case of FIG. 2, the task X and the task Y are in the dead lock state. Therefore, in accordance with the present invention, the blocks C and D, which are occupied by the task Y, are released, but the processing operation of task X is delayed. At this time, the data of the block D, which was modified at the time ⑨, and the data of the block C, which was modified at the time ⑤, are returned to their values before modification.

The task X is then released from the waiting state which was caused at time ⑦, the task X occupies the block C and writes the information "Block C is occupied by task X" in the waiting task control table, and the processing of the block C is carried out by task X. On the other hand, the task Y awaits the release of the occupation of the block C by the task X and the processing of the block C by the task Y is delayed.

Figure 3:
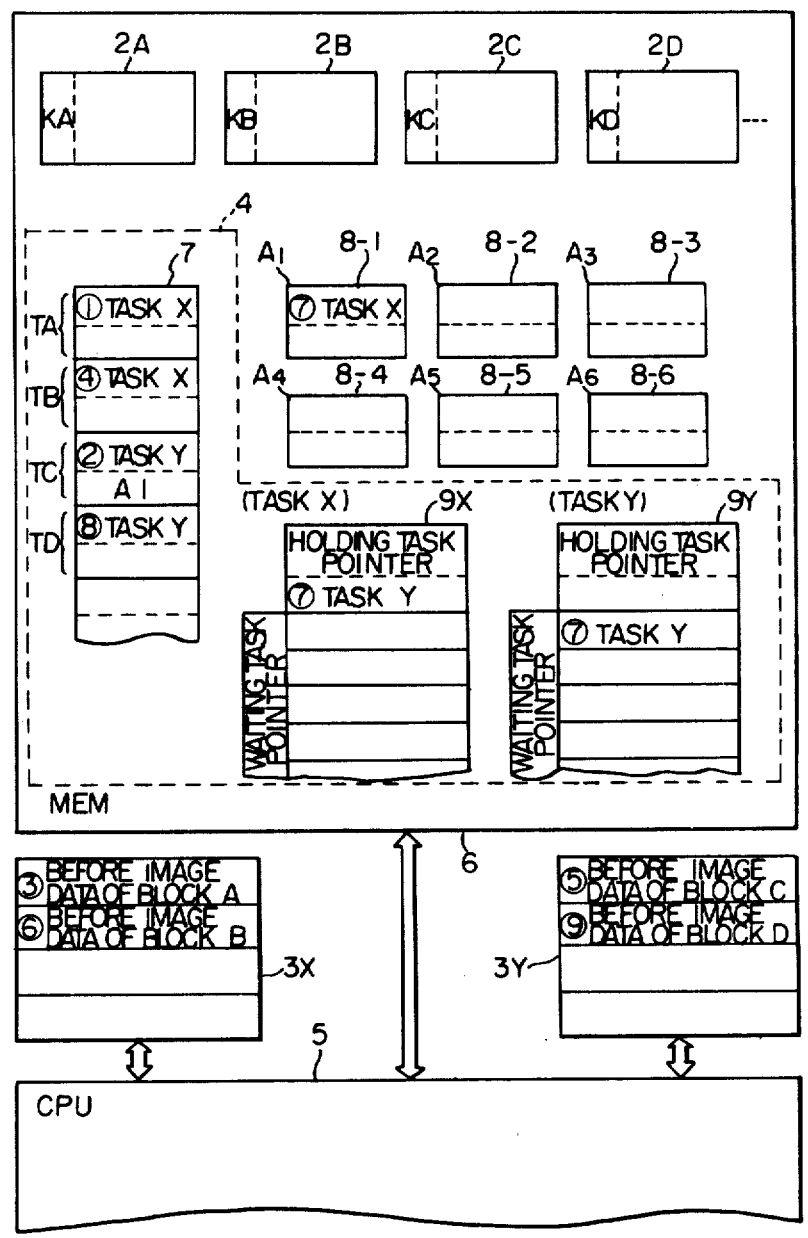
FIG. 3 is a block diagram of one embodiment of the present invention.

FIG. 3 is a block diagram of one embodiment of the present invention. Referring to FIG. 3, reference numerals 2A, 2B, 2C and 2D designate resources, 3X and 3Y designate before image data buffers, 5 designates a central processing unit (CPU), 6 designates a main memory MEM, 7 designates a key table, 8-1, 8-2, . . . designate a holding queue table, respectively, 9X and 9Y designate a registration table for tasks, respectively. The key table 7 and the registration tables 9X, 9Y in FIG. 3 correspond to the waiting task control table 4 in FIG. 2. Referring to FIG. 3, keys KA, KB . . . are provided corresponding to resources 2A, 2B, 2C, . . . , respectively, and are used for examining whether or not the resources are occupied when the resources are specified by tasks.

Assuming that the task X and the task Y are programmed as shown in FIG. 2, the data processing according to the present invention is carried out as follows.

(1) When the task X occupies the resource 2A at the time 1, the information designating "the task X" is written at an address position TA (corresponding to the key KA) of the key table 7, in accordance with the key KA corresponding to the resource 2A.

(2) When the task Y occupies the resource 2C at the time ②, the information designating "the task Y" is written at an address position TC (corresponding to the key KC) of the key table 7, in a manner similar to the process described in item (1), above.

(3) When the task X modifies the content of the resource 2A at the time ③, the before image data of the resource 2A (BLOCK A) is written and stored in one address, for example, a first address, in the before image data buffer 3X.

(4) When the task X occupies the resource 2B at the time ④, the information designating "the task X" is written at an address position TB (corresponding to the key KB) of the table, in a manner similar to the process described in item (1), above.

(5) When the task Y modifies the content of the resource 2C at the time ⑤, the before image data of the resource 2C (BLOCK C) is written and stored in one address, for example, a first address, in the before image data buffer 3Y.

(6) When the task X modifies the content of the resource 2B at the time ⑥, the before image data of the resource 2B (BLOCK B) is written and stored in one address, for example, a second address, in the before image data buffer 3X.

(7) When the task X tries to occupy the resource 2C at the time ⑦, the information "the resource 2C is occupied" as stored in the key KC is detected. Therefore, the information concerning "the task X" is stored in one of the holding queue tables 8, such as the table 8-1, and heading address information A1 in the holding queue table 8 is written in an address portion of location TC (corresponding to the key KC) in the key table 7.

(8) At this time, the information "the resource 2C is occupied by the task Y" is recognized and, at the same time, in accordance with the content of the address TC in the key table 7, the content of a holding task pointer, in the registration table for tasks 9Y, is examined. The content of the holding task pointer indicates whether or not the task Y is being kept waiting by a certain other task, and thus, whether or not the task Y is in the waiting state.

(9) In this example, the task Y is not in the waiting state at the time ⑦ and, therefore, it is recognized that the task X is in the waiting state. However, it is not in a dead lock state. Therefore, the information of the task Y is written in the holding task pointer in the registration table for tasks 9X, so as to indicate that the task X is in the waiting state because of the task Y. Further, the information of the task X is written in the waiting task pointer in the registration table for tasks 9Y so as to indicate that the task Y is keeping task X waiting.

(10) When the task Y occupies the resource 2D, at the time ⑧, the information indicating "the task Y" is written in an address portion of location TD (corresponding to the key KD) of the key table 7.

(11) When the task Y modifies the content of the resource 2D at the time ⑨, the before image data of the resource 2D (BLOCK D) is written and stored in the next (second) address of the before image data buffer 3Y for storing the before image data of the resources.

(12) When the task Y is to occupy the resource 2A at the time 10, it is recognized by means of the key KA that the resource 2A is already occupied by the task X.

Due to this fact, the content of the registration table for tasks 9X is examined, so that the content of the holding task pointer, that is, "task Y", is read out, and it is recognized that the task Y is in the waiting state, and also, in the dead lock state at the time 10 . Actually, the other registration tables for tasks are examined sequentially, by examining the content of the holding task pointer in one registration table for tasks 9X, and when "the task Y" is written in any one of the registration tables for tasks, it is recognized that the tasks X and Y are in the dead lock state.

(13) When the dead lock state is recognized, the contents of the resources 2D and 2C are restored in accordance with the content of the before image data buffer 3Y and the occupation of the resources 2C and 2D by the task Y is released. That is, the keys KC and KD in the key table are cleared and the corresponding information in locations TC and TD in key table 7 are released. Next, the content of the holding queue table 8-1 is written in the address portion of location TC (corresponding to the key KC) in the key table 7, and the resource 2C is occupied by the task X.

(14) At this time, the content of the before image data buffer 3Y is cleared and the contents of the registration tables for tasks 9X and 9Y are modified.

As mentioned above, according to the present invention, when a dead lock state is caused, the dead lock state is detected automatically and the occupation of the resource by the task which causes the dead lock state is released. However, the data processing by the tasks is still delayed until before image data of the resource is restored. Thus, the processing program can be planned and developed without imposing the condition of exclusive control of resources and without being overly concerned about the dead lock phenomenon.

Figure 4:
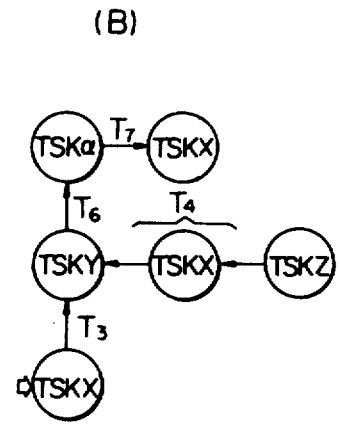
FIG. 4 is a block diagram utilized to describe a system which can release the dead lock state between four tasks.

FIG. 4 is a diagram of a system which can release a dead lock between four tasks X, Y, Z and $\alpha$ which commonly use resources A, B and C. In (A) of FIG. 4, when the task $\alpha$ is to occupy the resource A or B, at the time $T_7$, a dead lock state is caused.

When the task $\alpha$ is to occupy, for example, the resource A and a waiting state is caused, detection of whether or not the dead lock state is caused can be carried out by the following method. That is, the occupation and the waiting are repeated as shown in (A) of FIG. 4 and the waiting task table is formed as shown in (B) of FIG. 4.

Referring to (A) of FIG. 4, the task X is kept waiting by the task Y at time $T_3$; the task Y also keeps the task Z waiting at time $T_4$; the task Y is kept waiting by the task $\alpha$ at time $T_6$. In this condition, when the task $\alpha$ is being kept waiting by the task X at time $T_7$, a determination of whether or not the task X is in the waiting state, is judged in the left vertical column of (B) of FIG. 4. When the task X is in the waiting state, whether or not the task $\alpha$ is keeping the task X waiting is judged in the left vertical column of (B) of FIG. 4 in the direction of the arrow. If the task X is kept waiting by the task $\alpha$, the task X and the task $\alpha$ are in a dead lock state.

Figure 5:
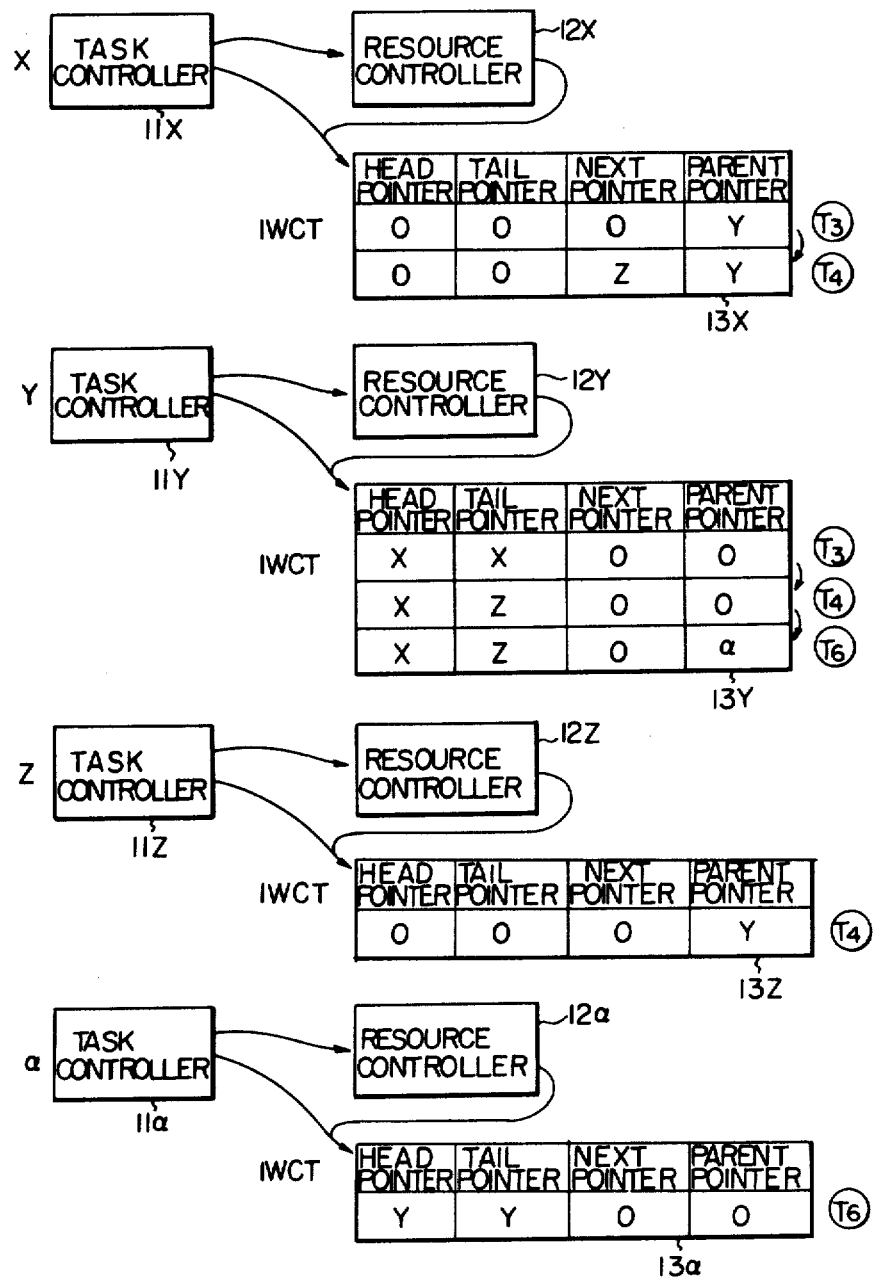
FIG. 5 is a block diagram of another embodiment of the present invention.

FIG. 5 is a diagram which shows the automatic release of the dead lock state between the task X and the task $\alpha$ shown in (A) of FIG. 4. Referring to FIG. 5, task controllers 11X, 11Y, 11Z, 11$\alpha$, resource controllers 12X, 12Y, 12Z, 12$\alpha$, and isolation wait control tables (IWCT) 13X, 13Y, 13Z, 13$\alpha$ are provided for each of the tasks X, Y, Z and $\alpha$. The task controllers have the function of controlling the execution of the task, and the resource controllers have the function of controlling the block of the resource occupied by the task.

The isolation wait control tables (IWCT) control all of the waiting states of the tasks. The isolation wait control tables include at least a head pointer, a tail pointer, a next pointer and a parent pointer. The head pointer designates an entry address of the isolation wait control table of the task which was placed in the waiting state prior to any other task by the task which corresponds to the isolation wait control table. The tail pointer designates an entry address of the isolation wait control table of the task which was placed in the waiting state most recently time by the task which corresponds to the isolation wait control table. The next pointer designates an entry address of the isolation wait control table of the task which was placed in the waiting state by the same holding task after the task which corresponds to the isolation control table when the task is in the waiting state. The parent pointer designates an entry address of the isolation wait control table of the holding task when the task which corresponds to the isolation wait control table is kept in the waiting state.

FIG. 5 shows, with regard to FIG. 4, the manner of setting the states of the isolation wait control tables of four tasks X, Y, Z, $\alpha$ as time proceeds. The contents of each isolation wait control table are cleared to "0" state at the initial state.

When the task X is to occupy the block B at the time $T_3$, the task X is placed in the waiting state, because the block B is already occupied by the task Y. Therefore, the information "Y" is written in the parent pointer of the isolation wait control table corresponding to the task X. At the same time, the contents of the head pointer and the tail pointer of the isolation wait control table corresponding to the task Y are changed. As only the task Y is keeping the task X waiting at this time, the same information "X" is written in the head pointer and the tail pointer.

When the task Z is to occupy the block B at the time $T_4$, the task Z is placed in the waiting state identical to the task X, because the block B is already occupied by the task Y. Therefore, the information "Y" is written in the parent pointer of the isolation control table corresponding to the task Z. As the task Y is keeping two tasks, that waiting (i.e., task X and task Z), the content of the tail pointer of the isolation control table corresponding to the task Y is changed from "X" to "Z" and, further, the information "Z" is written in the next pointer of the isolation wait control table corresponding to the task X.

When the task Y is to occupy the block C at the time $T_6$, the task Y is placed in the waiting state, because the block C is occupied by the task $\alpha$. Therefore, the information "$\alpha$" is written in the parent pointer of the isolation wait control table corresponding to the task Y and, at the same time, the contents of the head pointer and the tail pointer corresponding to the task $\alpha$ are changed. As only the task $\alpha$ is keeping the task Y waiting, the same information "Y" is written in the head pointer and the tail pointer 13$\alpha$.

When one task is to occupy one block, the resource controllers of all other tasks are examined to determine whether or not the block is occupied by another task. When the block is occupied by another task, the parent pointers of the isolation control tables of the other tasks are examined to determine whether the dead lock state has been generated or not. Only when it is determined that the dead lock state has not been generated, is the process of changing the content of the isolation wait control table at the times $T_3$, $T_4$, $T_6$, mentioned above carried out.

Next, the process of detecting the dead lock state when the task $\alpha$ is to occupy the block A at the time $T_7$ will be explained. When the task $\alpha$ is to occupy the block A at the time $T_7$, the task $\alpha$ determines whether or not the block A is occupied by another task, by examining the resource controllers of all other tasks. As the block A is already occupied by the task X at the time $T_1$, the block A is already registered in the resource controller corresponding to the task X. Therefore, the task $\alpha$ recognizes that the block A is occupied by the task X and, then, the task $\alpha$ examines the parent pointer of the isolation control table corresponding to the task X. When the fact that the information "Y" is written in the parent pointer of the isolation control table of the task X is recognized, the parent pointer of the isolation control table corresponding to the task Y is examined. As the information "$\alpha$" is written in the parent pointer of the isolation control table of the task Y, the task $\alpha$ recognizes that, if the task $\alpha$ occupies the block A, a dead lock state will be caused. After the dead lock state is determined in this manner, the task $\alpha$ releases the block C which was occupied by the task $\alpha$. At the same time the task Y recognizes that the task $\alpha$ has been keeping the task Y waiting, by the contents of the head pointer of isolation wait control table 13$\alpha$ and the tail pointer, and the processing of block C is transferred to the task Y. Therefore, the generation of the dead lock is prevented, the task Y occupies the block C after the time $T_8$, not shown in the drawing, and the processing of the task Y is completed. When the processing of the task Y is finished, the task Y releases the occupation of blocks B and C. Therefore, the processing of these block by the task X and the task $\alpha$, respectively, is possible. As mentioned above, the dead lock state can be prevented.

Figure 6C:
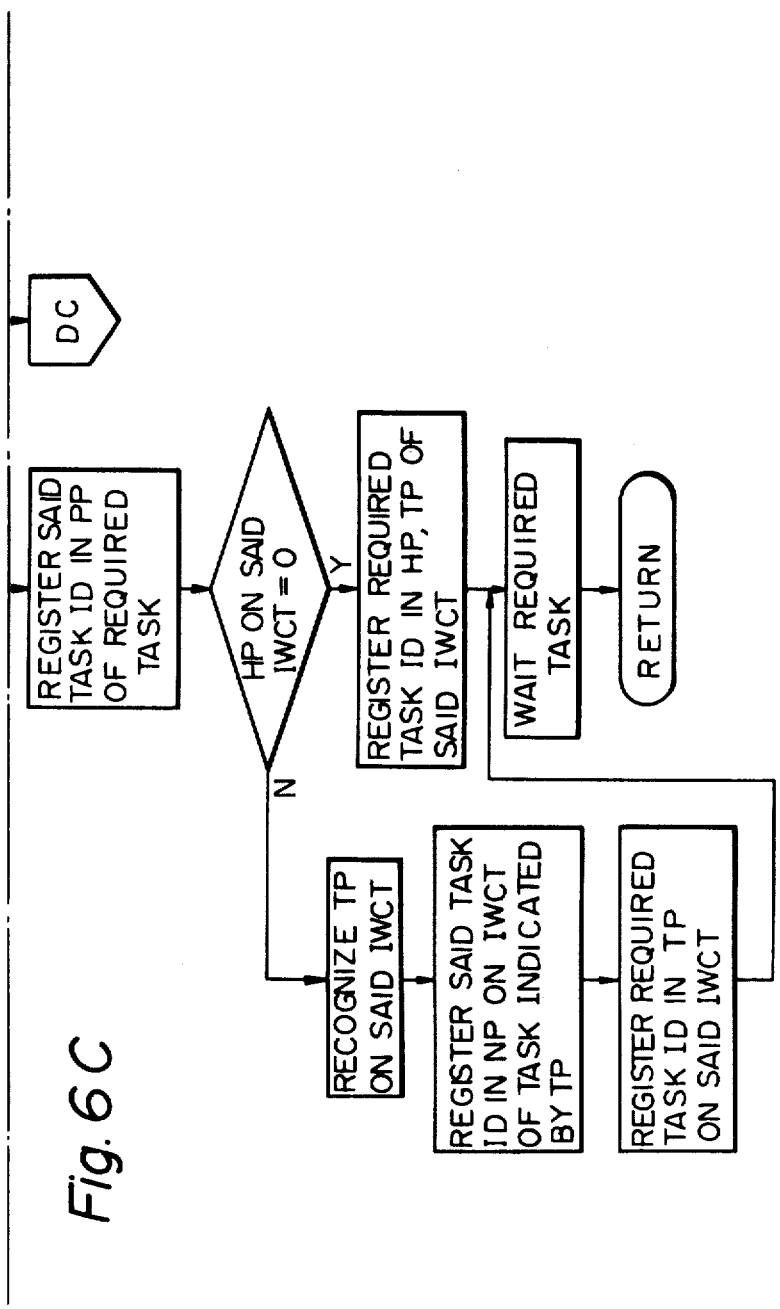
FIGS. 6 and 7 are flow charts illustrating the embodiment of FIG. 5.
Figure 7B:
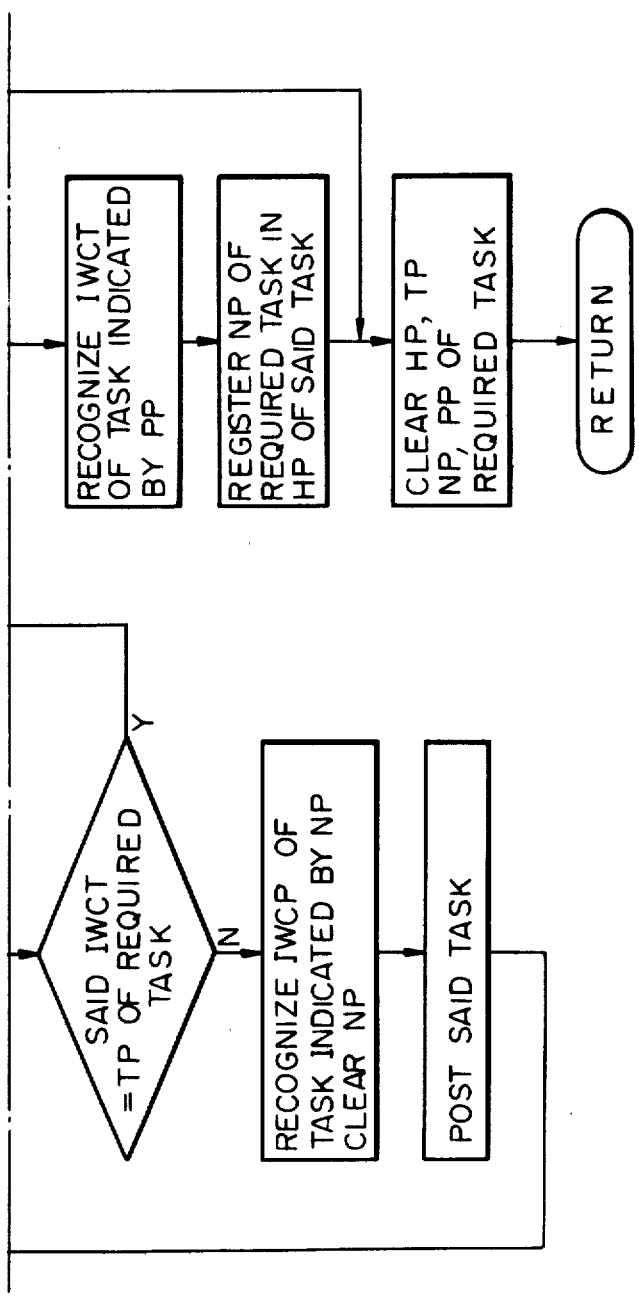

FIGS. 6 and 7 are flow charts corresponding to the embodiment of FIG. 5.

The key table 7 and the holding queue table 8, shown in FIG. 3, correspond to the resource controllers 12X, 12Y, 12Z, 12$\alpha$, shown in FIG. 5, the holding task pointers in the registration table for tasks 9X and 9Y, shown in FIG. 3, correspond to the parent pointer and the next pointer, respectively, shown in FIG. 5, and the waiting task pointers in the registration table for tasks 9X and 9Y, shown in FIG. 3, correspond to the head pointer and the tail pointer, respectively, shown in FIG. 5.

Next, the function of the block diagram shown in FIG. 5 is explained, based on FIG. 8 and FIGS. 9A through 9F.

FIG. 8 is a diagram which shows in detail the content of the task controllers 11X, 11Y, 11Z, 11$\alpha$ and resource controllers 12X, 12Y, 12Z, 12$\alpha$. As shown in FIG. 8, the task controller includes a task control table (TCT), and the resource controller includes a resource control table (RCT). Further, the task control table includes a task ID(TID), a resource control table address (RCT address) and IWCT address, and the resource control table includes a resource ID(RID) and a resource data (RD). This resource data is set at the time when the data is updated and is reset to zero at the time when the data is retrieved.

In FIGS. 9A through 9F, $x_1$ through $x_8$ denote registers which are used, that is, $x_1$ is a register for holding the TCT address of a task, $x_2$ is a register which is used as a RCT counter of a task, $x_3$ is a register for holding an IWCT address of the task, $x_4$ is a register for holding an IWCT address of a holding task, $x_5$ is a register for holding an IWCT address of the holding task, $x_6$ is a register which is used as a TCT temporary counter, $x_7$ is a register which is used as a RCT temporary counter and $x_8$ is a work register.

Figure 9A:
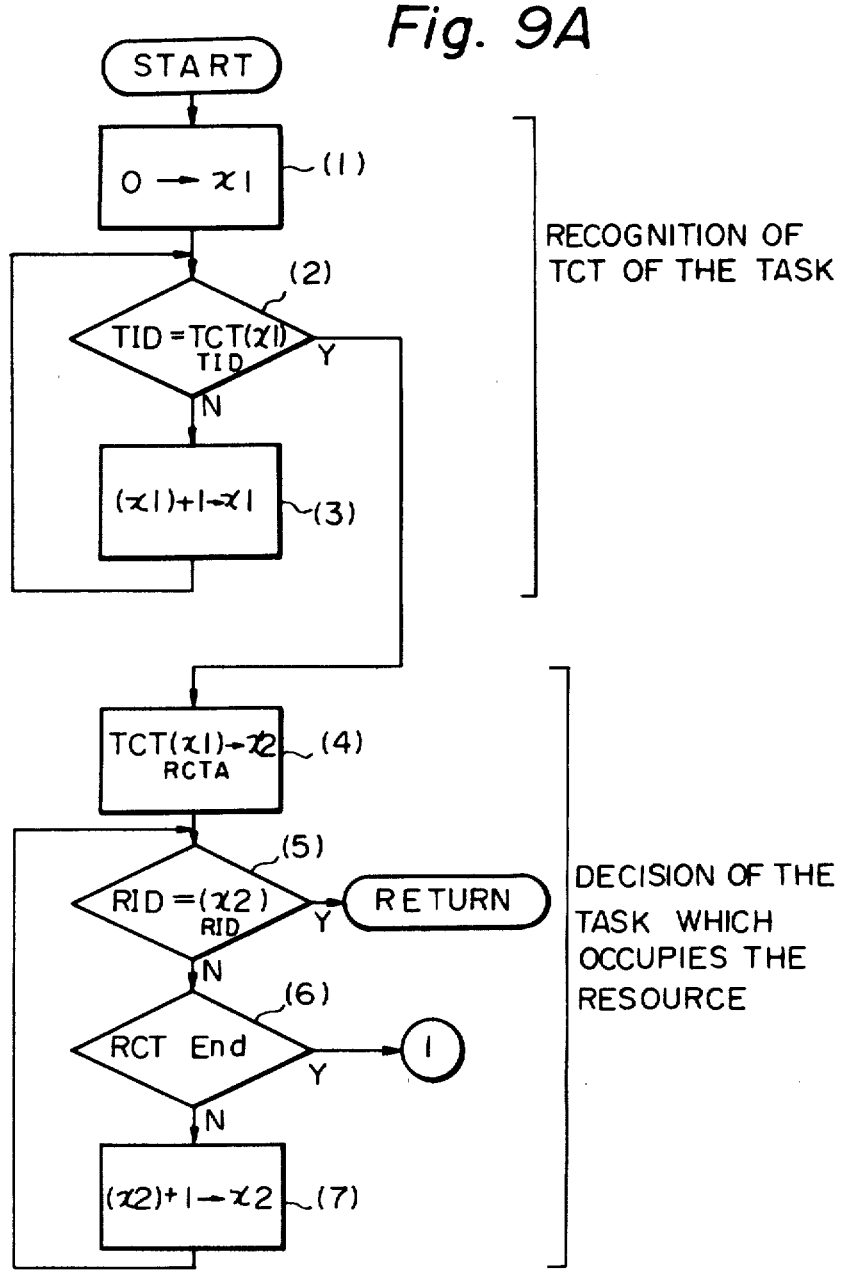
Figure 9B:
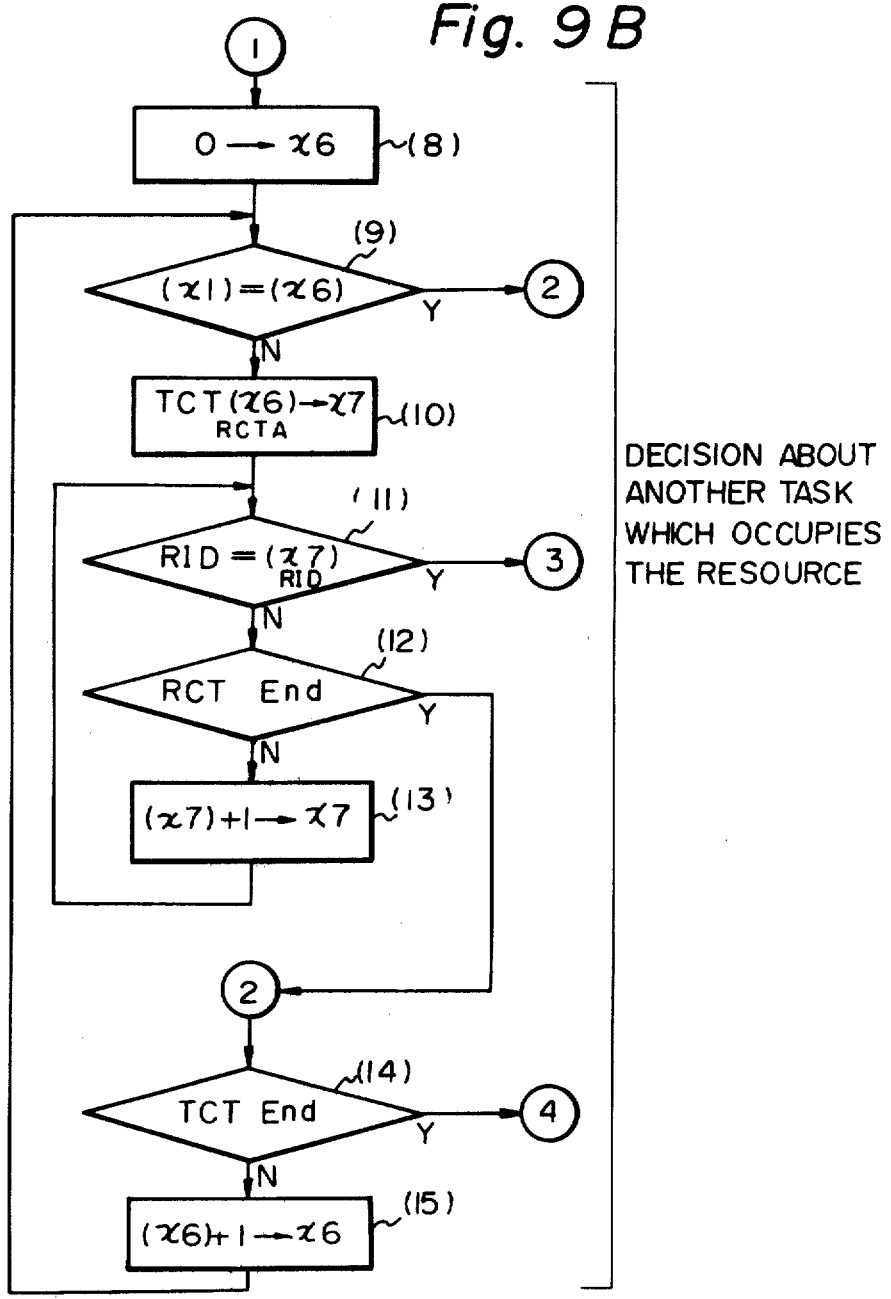
Figure 9D:
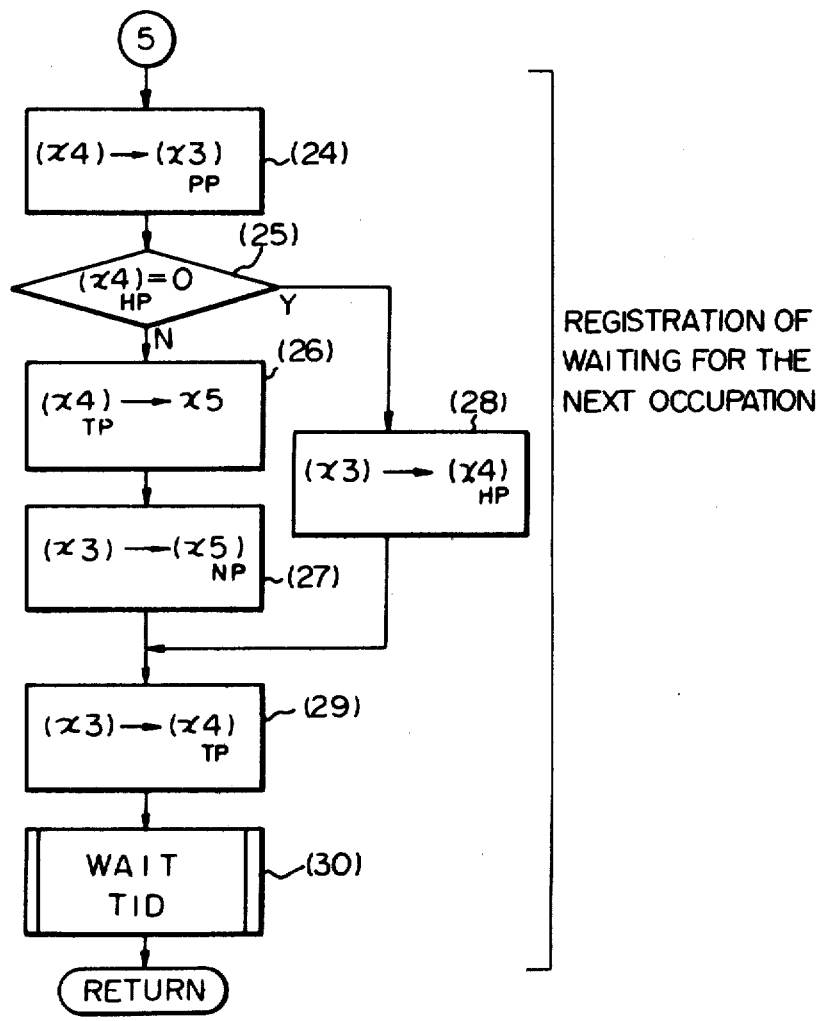
Figure 9E:
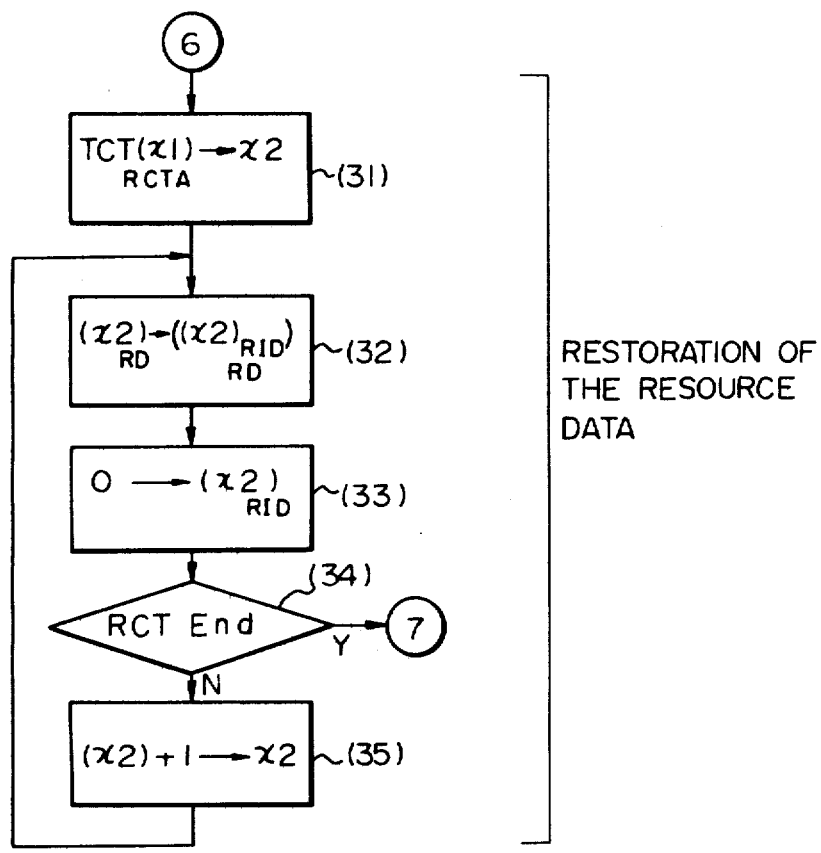
Figure 9F:
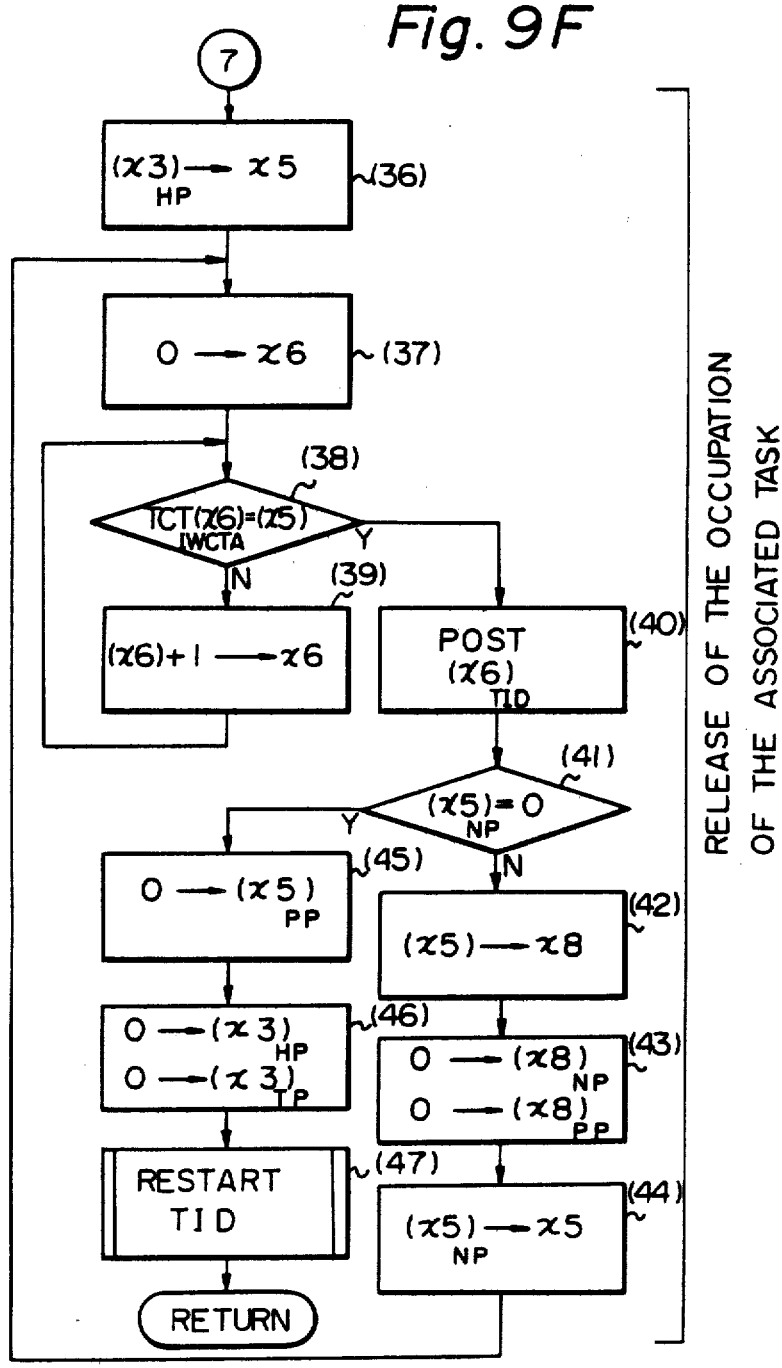

FIG. 9A illustrates a TCT recognition process of the task and a decision process of the task when the resource is occupied, FIG. 9B illustrates a decision process of another task when the resource is occupied, FIG. 9C illustrates a registration process of the resource and a dead lock decision process, FIG. 9D illustrates a holding queue registration process, FIG. 9E is a restoration process of the resource data and FIG. 9F is a releasing process for the occupied associated tasks.

The following describes the functions of each step shown in the flow charts of FIGS. 9A through 9F.

(1) "0" is set in the $x_1$ register.

(2) The TCT of the task is recognized based on the task which is desired.

(3) +1 is added to the content of the $x_1$ register.

(4) An address of RCT of the task which is desired is set in the register 2.

(5) Whether or not the RID which is desired is already registered in the RCT of the task is determined.

(6) Whether item (5) is examined with respect to all entries of RCT is determined.

(7) +1 is added to the content of the register $x_2$.

(8) "0" is set in the register $x_6$.

(9) Whether or not the contents of the register $x_1$ and the register $x_6$ are equal is determined.

(10) An address of RCT of another task is set in the register $x_7$.

(11) Whether or not the RID which is desired is occupied by another task is decided by the RCT.

(12) Whether or not item (11) is examined with respect to all entries is determined.

(13) +1 is added to the content of the register $x_7$.

(14) Whether the item (12) above is examined for all entries is determined.

(15) +1 is added to the content of the register $x_6$.

(16) (17) RID and RD are occupied and registered to RCT of task, because the RID which is desired is not occupied by another task.

(18) An address of IWCT of the task which occupies the RID which is desired is set in the register $x_4$.

(19) The content of the register $x_4$ is set in the register $x_5$.

(20) Whether or not a parent pointer (PP) indicated by the register $x_5$ is 0 is determined.

(21) The content of the parent pointer (PP) indicated by the register is set in the register $x_5$.

(22) The address of the IWCT of the task which is desired is set in the register $x_3$.

(23) Whether or not the content of the register $x_3$ is equal to the content of the register $x_5$ is determined.

(24) The address of the IWCT of the task which is occupied is set in the parent pointer (PP) of IWCT of the task which is desired.

(25) A heat pointer (HP) of the IWCT of the task which is desired is decided and whether or not this task has another task in the waiting state is decided.

(26) An address of the IWCT of the task indicated by a tail pointer (TP) is set in the register $x_5$.

(27) The address of IWCT of the task which is desired is set in a next pointer (NP) of IWCT of the task indicated by the tail pointer (TP).

(28) The address of IWCT of the task which is desired is set in the head pointer of IWCT of the task with which it is newly occupied.

(29) The address of IWCT of the task which is desired is set in the tail pointer (TP) of IWCT of the occupied task.

(30) The TID which is placed in the waiting state for the purpose of placing the task which is desired in the waiting state.

(31) The address of PCT of the task which is desired is set in the register $x_2$.

(32) RD which is occupied and registered in PCT is rewritten based on RID.

(33) PCT which is occupied and registered is released.

(34) Whether RCT is processed for all entries is determined.

(35) +1 is added to the content of the register $x_2$.

(36) The address of IWCT of the task indicated by the head pointer (HP) of IWCT of the task which is desired is set in the register $x_5$.

(37) "0" is set in the register $x_6$.

(38) The TCT of the task which is placed in the waiting condition by the task which is desired is recognized.

(39) +1 is added to the content of the register $x_6$.

(40) The task which is placed in the waiting condition by the task is posted so as to release the same.

(41) Whether or not another task which is placed in the waiting condition by the task which is desired exists is decided by the next pointer.

(42) The content of the register $x_5$ is set in the register $x_5$.

(43) The next pointer (NP) and the parent pointer (PP) of IWCT of said task are cleared.

(44) The address of IWCT of the task which is in the waiting state and which is indicated by the next pointer (NP) of IWCT of said task is set in the register $x_5$.

(45) The parent pointer (PP) of the IWCT of said task is cleared.

(46) The head pointer (HP) and the tail pointer (TP) of IWCT of the task which is desired are cleared.

(47) The task which is desired is restarted.

Numerous modifications and adaptations of the system of the invention will be apparent to those skilled in the art and thus it is intended by the appended claims to cover all such modifications and adaptations which fall within the true spirit and scope of the invention.

I claim:

1. A method for automatically releasing a dead lock state in a data processing system having a CPU for performing tasks, and having a memory, including resources commonly used by the tasks, a before image data buffer having portions respectively corresponding to the tasks, and a waiting task control table including registration tables respectively corresponding to the tasks, each of the registration tables comprising a head pointer portion, a tail pointer portion, a next pointer portion and a parent pointer portion, said method comprising the steps of:

(a) storing waiting state information in the waiting task control table to indicate which of the tasks are in a waiting state due to the occupation of one of the resources by the other tasks, said storing step (a) comprising the sub-steps of:

(i) writing, in the head pointer portions of the respective registration tables, the entry address of the registration table corresponding to the first one of the tasks placed in a waiting state by the task corresponding to the respective registration table;

(ii) writing, in the tail pointer portions of the respective registration tables, the entry address of the registration table corresponding to the task most recently placed in a waiting state by the task corresponding to the respective registration table;

(iii) writing, in the next pointer portions of the respective registration table, the entry address of the registration table corresponding to the task placed in a waiting state by the same occupying task after the task corresponding to the respective registration table;

(iv) writing, in the parent pointer portions of the respective registration tables, the entry address of the registration table corresponding to the occupying task which is keeping the task corresponding to the respective registration table in the waiting state;

(b) storing before image data in the respective before image data buffer portion corresponding to a task which is modifying one of the resources;

(c) examining, for a selected task most recently placed in a waiting state, the waiting state information for the other tasks, by reading the contents of the registration tables respectively corresponding to the other tasks;

(d) determining whether the waiting state information for the other tasks indicates that the waiting state of at least one of the other tasks is due to the occupation of a resource by the selected task;

(e) releasing the resource occupied by the selected task when said determining step (d) indicates that at least one of the other tasks is in a waiting state due to the occupation of a resource by the selected task;

(f) processing the at least one of the other tasks in accordance with the contents of the respective before image data buffer portion corresponding to the selected task; and (g) processing the selected task.

2. A method for automatically releasing a dead lock state in a data processing system having a CPU for performing tasks, and having a memory, including resources commonly used by the tasks, a waiting task control table and a before image data buffer, comprising the steps of:

(a) storing waiting state information in the waiting task control table to indicate which of the tasks are in a waiting state due to the occupation of one of the resources by the other tasks;

(b) storing before image data in the storing before image data buffer every time the contents of one of the resources is to be modified by one of the tasks;

(c) examining, for a selected task most recently placed in a waiting state, the waiting state information for the other tasks, by reading the contents of the waiting task control table;

(d) determining whether the waiting state information for the other tasks indicates that the waiting state of at least one of the other tasks is due to the occupation of a resource by the selected task;

(e) releasing the resource occupied by the selected task when said determining step (d) indicates that at least one of the other tasks is in a waiting state due to the occupation of a resource by the selected task; and (f) processing the at least one of the other tasks in accordance with the contents of the before image data buffer.

3. A method for automatically releasing a dead lock state in a data processing system as set forth in claim 2, wherein the waiting task control table includes registration tables respectively corresponding to each of the tasks, wherein each of the registration tables includes a holding task pointer and a waiting task pointer, wherein the waiting state information includes first and second waiting state data, and wherein said storing step (a) comprises the sub-steps of:
(i) storing first waiting state data for the tasks in the respective, corresponding holding task pointers, the first waiting state data indicating which of the other tasks is keeping a respective one of the tasks in a waiting state; and
(ii) storing second waiting state data for the tasks in the respective, corresponding waiting task pointers, the second waiting state data indicating which of the tasks is being kept in a waiting state by a respective one of the tasks.

4. A method for automatically releasing a dead lock state in a data processing system as set forth in claim 3, wherein the waiting task control table includes a key table having portions respectively, corresponding to the resources, and wherein said method further comprises the step of:
(g) storing occupation information in the key table portions, indicating that one of the tasks is occupying respective, corresponding ones of the resources.

5. A method for automatically releasing a dead lock state in a data processing system as set forth in claim 4, wherein said storing step (g) comprises storing occupation information, indicating which of the respective tasks is occupying each of the resources, in the respective, corresponding key table portions.

6. A method for automatically releasing a dead lock state in a data processing system as set forth in claim 2, wherein the waiting task control table includes a key table having portions respectively, corresponding to the resources, and wherein said method further comprises the step of:
(g) storing occupation information in the key table portions, indicating that one of the tasks is occupying respective, corresponding ones of the resources.

7. A method for automatically releasing a dead lock state in a data processing system as set forth in claim 6, wherein said storing step (g) comprises storing occupation information, indicating which of the respective tasks is occupying each of the resources, in the respective, corresponding key table portions.

8. A method for automatically releasing a dead lock state in a data processing system as set forth in claim 6, wherein the memory further comprises a holding queue table, and wherein said method further comprises the step of:
(h) storing task information in the holding queue table for each of the tasks which is in a waiting state.

9. A method for automatically releasing a dead lock state in a data processing system as set forth in claim 8, wherein each of the key table portions includes an address storing portion, and wherein said method further comprises the step of:
(i) storing a holding address in the respective address storing portion corresponding to the resource for which a respective task is waiting, the holding address corresponding to the address in the holding queue table which stores task information for the respective waiting task.

10. A method for automatically releasing a dead lock state in a data processing system as set forth in claim 4, wherein the memory further comprises a holding queue table, and wherein said method further comprises the step of:
(h) storing task information for each of the tasks which is in a waiting state.

11. A method for automatically releasing a dead lock state in a data processing system as set forth in claim 10, wherein each of the key table portions includes an address storing portion, and wherein said method further comprises the step of:
(i) storing a holding address in the respective address storing portion corresponding to the resource for which a respective task is waiting, the holding address corresponding to the address in the holding queue table which stores task information for the respective waiting task.

12. A method for automatically releasing a dead lock state in a data processing system as set forth in claim 3, wherein the memory further comprises a holding queue table and wherein said method further comprises the step of:
(g) storing task information in the holding queue table for each of the tasks which is in a waiting state.

13. A method for automatically releasing a dead lock state in a data processing system as set forth in claim 12, wherein the waiting task control table includes a key table having portions, respectively corresponding to the resources, wherein each of the key table portions includes an address storing portion, and wherein said method further comprises the step of:
(h) storing a holding address in the respective address storing portion corresponding to the resource for which a respective task is waiting, the holding address corresponding to the address in the holding queue table which stores task information for the respective waiting task.

* * * * *

UNITED STATES PATENT AND TRADEMARK OFFICE
CERTIFICATE OF CORRECTION

PATENT NO. : 4,403,285
DATED : SEPTEMBER 6, 1983
INVENTOR(S) : RYOICHI KIKUCHI

It is certified that error appears in the above-identified patent and that said Letters Patent is hereby corrected as shown below:

```
Col. 1, line 49, "it" should be --is--.
Col. 2, line 52, "place" should be --placed--.
Col. 3, line 68, "1" should be -- ①--.
Col. 5, line 5,  "10" should be -- ⑩--.
Col. 6, line 13, delete "time".
Col. 10, line 9, "table" should be --tables--.
```

Signed and Sealed this

Thirteenth Day of December 1983

[SEAL]

Attest:

GERALD J. MOSSINGHOFF

Attesting Officer

Commissioner of Patents and Trademarks